United States Patent [19]

Buell

[11] Patent Number: 5,303,795
[45] Date of Patent: Apr. 19, 1994

[54] MOTORCYCLE LUGGAGE CARRIER

[75] Inventor: Erik Buell, Mukwonago, Wis.

[73] Assignee: Buell Motor Company, Inc., Mukwonago, Wis.

[21] Appl. No.: 109,462

[22] Filed: Aug. 20, 1993

Related U.S. Application Data

[63] Continuation of Ser. No. 908,481, Jun. 30, 1992, abandoned, which is a continuation of Ser. No. 645,219, Jan. 24, 1991, abandoned.

[51] Int. Cl.[5] .............................................. B62J 7/02
[52] U.S. Cl. ................................... 180/219; 224/32 R; 224/30 R; 224/42.42; 224/282; 296/37.1; 296/78.1; 280/769
[58] Field of Search .................... 224/30 R–32 R, 224/35, 36, 39–41, 42.42, 274, 281, 282; 296/37.1, 37.12, 78.1; 180/218, 219; 280/769

[56] References Cited

U.S. PATENT DOCUMENTS

| | | | |
|---|---|---|---|
| D. 270,436 | 9/1983 | Gaddi | 296/37.12 |
| 1,556,353 | 10/1925 | Roedding | 224/282 |
| 1,625,011 | 4/1927 | Wolfe et al. | 224/42.42 X |
| 1,646,266 | 10/1927 | Stoner | 224/282 |
| 1,815,656 | 7/1931 | McMurray | 296/37.1 |
| 2,491,062 | 12/1949 | Shephard | 224/32 R |
| 3,779,597 | 12/1973 | Uchida | 224/31 X |
| 4,135,758 | 1/1979 | Clements | 296/78.1 |
| 4,278,285 | 7/1981 | Cummings et al. | 296/78.1 |
| 4,372,602 | 2/1983 | Tsuchiya et al. | 296/78.1 X |
| 4,473,251 | 9/1984 | Murayama | 296/78.1 |
| 4,522,442 | 6/1985 | Takenaka | 296/37.1 |
| 4,915,188 | 4/1990 | Ota et al. | 180/219 |
| 4,964,484 | 10/1990 | Buell | 180/219 |
| 5,040,632 | 8/1991 | Fujii et al. | 224/32 R X |
| 5,062,495 | 11/1991 | Padgett | 180/219 |
| 5,072,983 | 12/1991 | Muroi et al. | 224/42.42 X |

FOREIGN PATENT DOCUMENTS

| | | | |
|---|---|---|---|
| 0206770 | 5/1959 | Austria | 224/30 |
| 0032117 | 8/1923 | Denmark | 180/219 |
| 0880711 | 6/1953 | Fed. Rep. of Germany | 180/219 |
| 1088035 | 3/1955 | France | 224/32 R |
| 0447147 | 4/1949 | Italy | 224/32 R |
| 8183329 | 10/1983 | Japan | 224/42.42 |
| 1-197186 | 8/1989 | Japan | 224/30 R |
| 1-275281 | 11/1989 | Japan | 224/30 R |
| 2-077377 | 3/1990 | Japan | 224/32 R |
| 2-197476 | 8/1990 | Japan | 224/42.42 |
| 3-61186 | 3/1991 | Japan | 224/42.42 |
| 0138757 | 2/1920 | United Kingdom | 180/219 |

Primary Examiner—J. Casimer Jacyna
Attorney, Agent, or Firm—Andrus, Sceales, Starke & Sawall

[57] ABSTRACT

A motorcycle having a pair of hinged storage compartments with a front wall, a rear wall, side walls and a floor are pivotally attached to the motorcycle fairing generally midway between the front and rear wheels, forward of the seat, rearward of the steering column and substantially adjacent and on opposite sides of the engine in order to promote a stabilizing influence and maintain aerodynamic balance for the motorcycle.

3 Claims, 3 Drawing Sheets

MOTORCYCLE LUGGAGE CARRIER

This application is a continuation application Ser. No. 07/908,481 filed Jun. 30, 1992, now abandoned, which is a continuation application of Ser. No. 07/645,219, filed Jan. 24, 1991, now abandoned.

BACKGROUND OF THE INVENTION

The present invention relates to a luggage compartment adapted for use in a motorcycle or like vehicle, and more specifically to a luggage compartment that is generally located at or forward the vehicle's vertical center of gravity and preferably located on, and interior, to the fairing or chassis of the cycle.

Generally, luggage compartments for motorcycles or the like are accessories attached at physically convenient locations behind the rider such as bags or containers mounted to or slung over rear mounted carrier racks or surfaces such as described, for example, in U.S. Pat. No. 4,195,757. A typical design is a pair of side mounted leather bags hung by straps over a framework that encloses the rear of the motorcycle. Other proposed designs include luggage carriers mounted to backrests such as those described in U.S. Pat. Nos. 3,901,534 and 3,850,353. However, a problem with all of these conventional designs lies in their adverse effects on the operating stability of the cycle. A motorcycle's general handling, including weave and wobble stability, are degraded by adding significant amounts of weight behind the vertical center of gravity of the motorcycle, i.e. at the rear of the cycle. As such, large luggage compartments located behind the passenger can significantly degrade the stability and handling of a cycle. Generally, this limits the amount of weight that luggage compartments located behind the driver can carry. If larger capacity rear storage is desired, significant engineering efforts are required to make compensating improvements to counteract the potential destabilizing influences of such a luggage capacity.

SUMMARY OF THE INVENTION

It is an object of the invention to alleviate the above discussed problems in providing large capacity luggage compartments for motorcycles, and the like, principally by providing large luggage compartment capacity which intrinsically has minimal destabilizing effects on general motorcycle handling and performance.

It is a further object of this invention to provide a luggage compartment which integrates with the design of a cycle to provide an overall aerodynamically efficient and aesthetically pleasing appearance for the cycle.

It is a general object of this invention to provide a significantly improved luggage compartment design adapted for use in a motorcycle or like vehicle.

The present invention in its broadest conceived embodiment provides one or two luggage compartments mounted to the side chassis, body or fairing of a motorcycle, motor scooter or the like, which compartment(s) is mounted at or forward of the vehicle's center of gravity, generally in front of the driver's legs. Locating the luggage compartment in such a location minimizes vehicle handling problems while providing an integral design which is both structurally and aesthetically efficient. It has been found that placing a luggage compartment at this location minimizes adverse influences on the vehicle's handling and can actually improve weave and wobble stability.

These and other objects, as well as the scope, nature and utilization of the invention, will be apparent to those skilled in the art from the following description and the appended claims.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
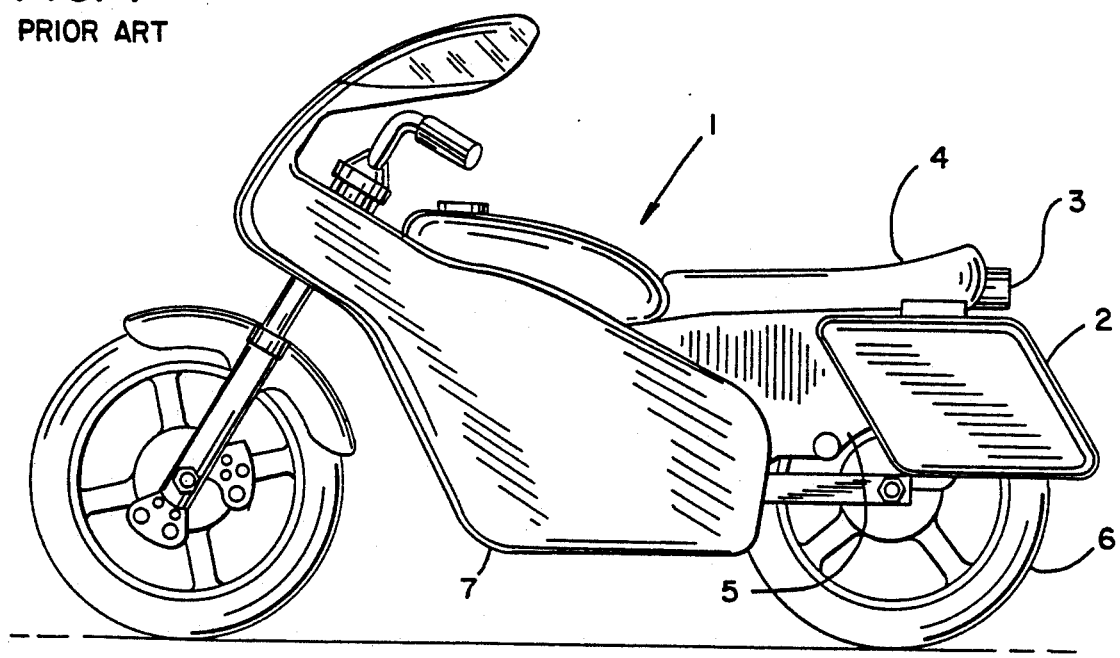
FIG. 1 is a side view of a motorcycle typifying the prior art.

FIG. 1 is a side view of a motorcycle having a typical prior art arrangement for mounting luggage compartments. Side saddlebags or compartments 2 are strapped over the rear carrier section 3 of the cycle's seat 4 and over a frame section 5 which encloses a portion of the rear wheel section 6 of motorcycle 1. This added weight to the tail section of motorcycle 1 can significantly diminish the overall stability of the motorcycle and cause wobble or weave. The present invention proposes to eliminate the problems associated with this typical design by providing a luggage compartment integral with the fairing, chassis or body 7 of motorcycle 1.

Preferably to maximize the stabilizing effect of the luggage compartments 8, they are located on either side of motorcycle 1 at a location behind steering column 11 and at or forward of the center of gravity 9 of the motorcycle which is generally forward of the driver 10. This arrangement also allows easy and ready rider access to the compartment from the seated position.

The fairing or chassis 7 is mounted to motorcycle 1 by any conventional method and generally encloses the forward portion of the cycle including the power plant and upper front steering column and handle bar section 11.

Figure 2:
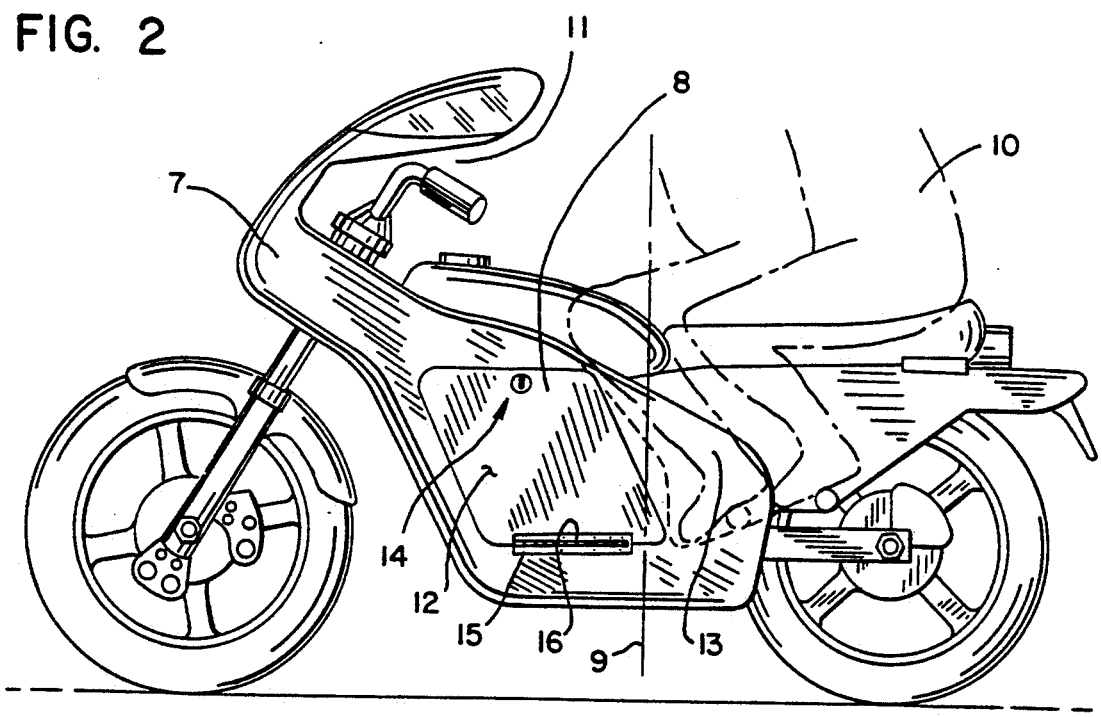
FIG. 2 is a side view of a motorcycle embodying the present invention.
Figure 3:
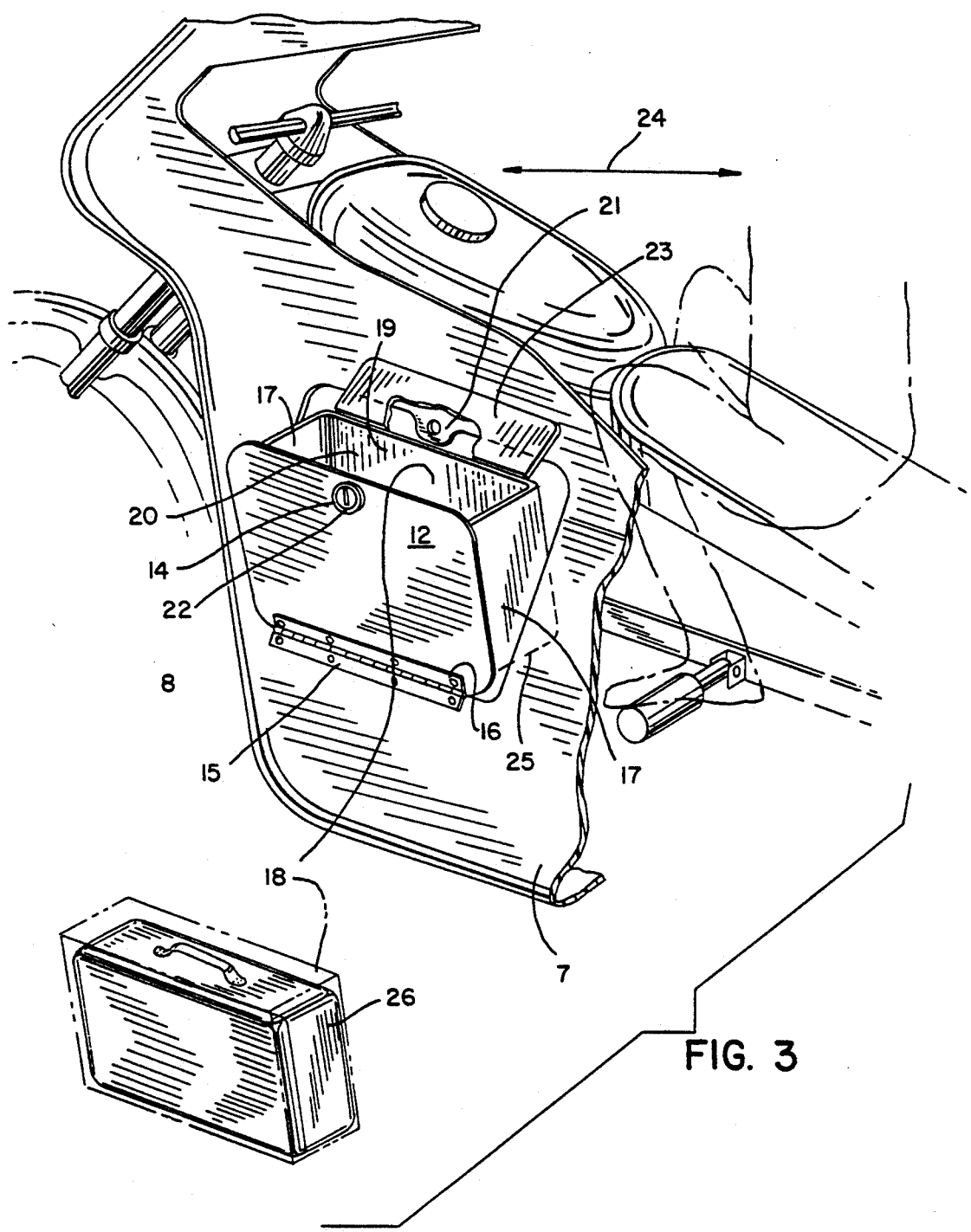
FIG. 3 is a side angular perspective view of the motorcycle of FIG. 2 with the compartment open.

As shown in FIGS. 2 and 3 luggage compartment 8 is mounted on chassis or fairing 7 by means of a hinge 15 and latching arrangement 14. The compartment 8 depicted in FIG. 2 has a parallelogram shape with the top of compartment 8 at a level even with or below the top of the front wheel. However, any other suitable shape could be employed. The front panel 12 of compartment 8 is hinged at lower end 16 by a suitable hinge 15 and releasably engages fairing or chassis 7, by means of a latch 20 and catch 21 arrangement wherein the latch 20 will preferably be provided with a locking mechanism 22. However, any other suitable clasping and/or locking arrangements available in the art could be employed. Panel 12 is pivotally movable between a closed position (FIG. 2) in which it is substantially flush with fairing 7 and an open position (FIG. 3) in which access to cavity 18 is permitted via a top opening.

The luggage compartment itself is formed by means of front panel 12, defining side walls 17 extending inwardly from opposite edges of panel 12, rear wall 19 connecting the inner edges of side walls 17 and compartment floor 25. The cavity 18 formed by the side walls 17, front panel 12 and rear wall 19 can be opened at the top or the sides, if suitable sealable closures are provided such as zippers. Preferably a separate removable soft luggage piece 26, fitted to cavity 18 is provided. Alternately, or in addition to this, the top opening compartment will be provided with a top sealable closure member 23 to prevent spillage of luggage during cycle operation.

The capacity of the storage cavity is generally only limited by the cross sectional shape of the compartment and the width 24 of the fairing or chassis body. In many cases, the configuration of the vehicle engine will force the compartment to be split into left and right compartments as in FIG. 3. Still, extremely large capacity compartments can be provided within the fairing or chassis body.

Figure 4:
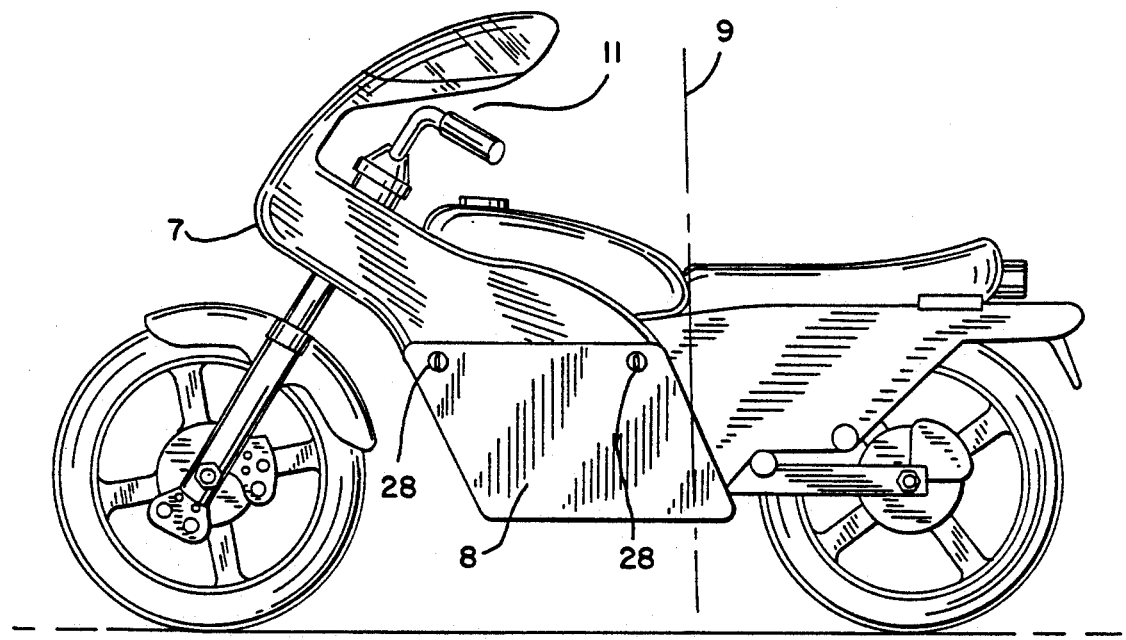
FIG. 4 is a side view of a motorcycle embodying an alternate embodiment of the invention.

FIG. 4 illustrates an alternate embodiment of the invention in which luggage compartment 8 itself is capable of serving as luggage and is easily removable from fairing 7 so that it may be carried away as a piece of luggage. In this embodiment, luggage compartment 8 is releasably connected to fairing 7 by a pair of fasteners 28. Rotation of fasteners 28 permits removal of the entire luggage compartment 8.

Other embodiments of the invention will be apparent to those skilled in the art from a consideration of the specification and practice of the invention disclosed herein. It is intended that the specification and preferred embodiment be considered as an example only, with the true scope and spirit of the invention being indicated by the following claims.

Various modes of carrying out the invention are contemplated as being within the scope of the following claims particularly pointing out and distinctly claiming the subject matter regarded as the invention.

I claim:

1. In a motorcycle of the type having front and rear wheels, a steering column connected to the front wheel, a seat for the operator, an engine disposed between the steering column and the seat, a fairing extending rearwardly around the steering column and enclosing the engine and a vertical center of gravity, a pair of forwardly mounted main storage compartments disposed in said fairing generally midway between the front and rear wheels, forward of the seat and the vertical center of gravity, rearward of the steering column and substantially adjacent and on opposite sides of the engine with each of said compartments defined by a rear wall adjacent the engine, a front panel flush with the fairing, at least one side wall connecting the rear wall and the front panel and a compartment floor, with said front panel having a lower end pivotally attached to said fairing by a hinge extending generally horizontally along said lower end so that each of said compartments may be pivotally moved between a closed position in which said front panel is flush with the fairing and an open position in which said compartment is rotated away from the engine and access to said compartment is provided, said front panel having latching means to releasably maintain said front panel in said closed position and locking means combined with said latching means to prevent release of said latching means, said compartments being constructed and arranged to promote a stabilizing influence and maintain aerodynamic balance for said motorcycle.

2. The motorcycle storage compartments defined in claim 1 wherein said at least one side wall on each of said compartments further comprises a pair of side walls extending inwardly from opposite edges of said front panel, to said rear wall so that an upwardly opening compartment is defined.

3. The motorcycle storage compartments defined in claim 1 wherein each of said storage compartments is provided with a removable luggage piece.

* * * * *